Sept. 19, 1967 H. AUMÜLLER ET AL 3,342,943
REPERTOIRE DIALING SYSTEM
Filed April 22, 1964
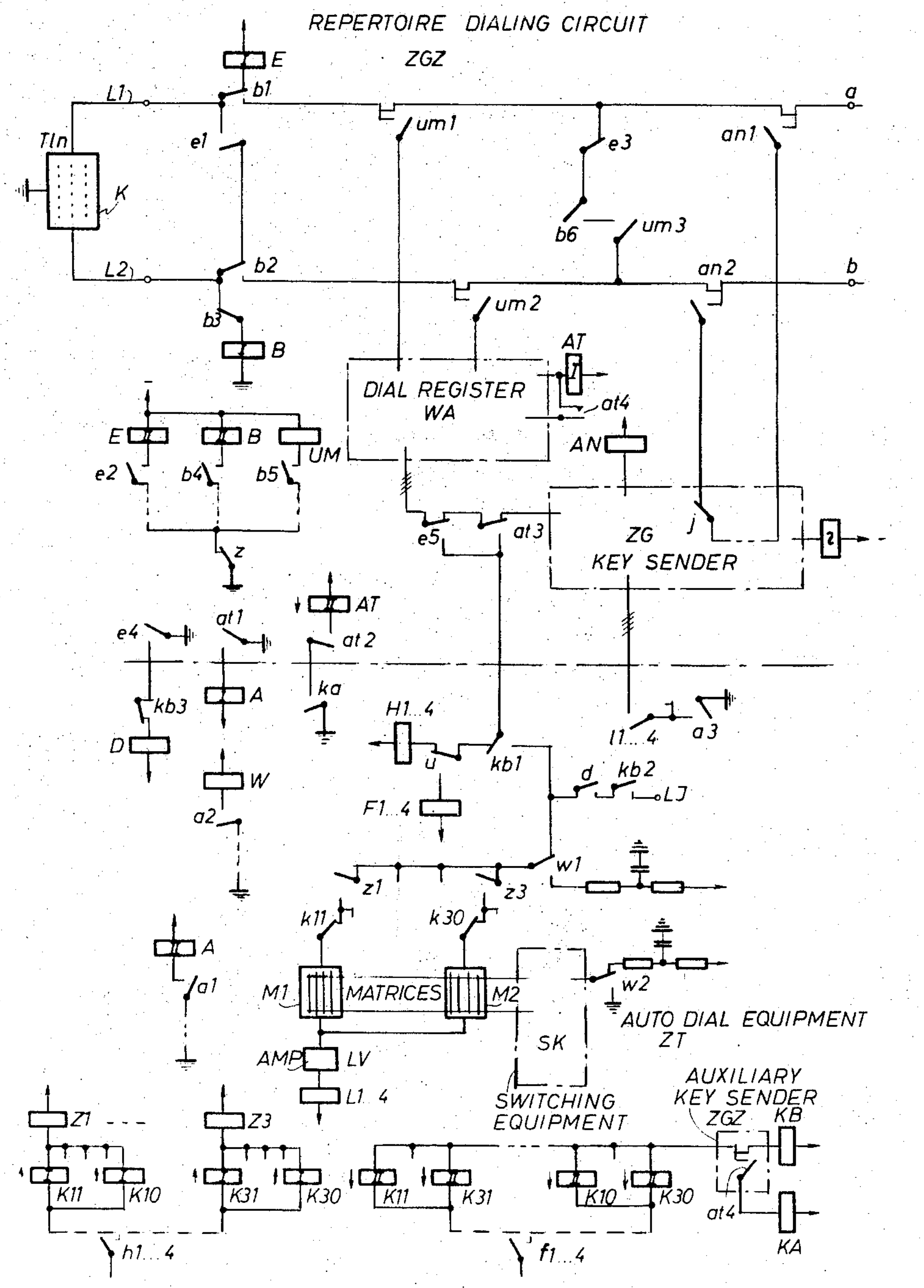

3,342,943

REPERTOIRE DIALING SYSTEM

Hans Aumüller, Besigheim, Wurttemberg, and Dietrich Klemt, Ditzingen, Wurttemberg, Germany, assignors to International Standard Electric Corporation, New York, N.Y., a corporation of Delaware Filed Apr. 22, 1964, Ser. No. 361,702
Claims priority, application Germany, Apr. 23, 1963, St 20,525
4 Claims. (Cl. 179—18)

ABSTRACT OF THE DISCLOSURE

A repertoire dialing system is provided wherein any stored number can be changed by depressing the associated access button and dialing the digits of a new number without removing the handset. If the handset is removed without dialing and the associated access button is depressed, the previously stored number is out-pulsed and no storage change is effected.

This invention relates in general to abbreviated or repertoire dialing systems and in particular to two-digit repertoire dialing systems of the type wherein any one of a group of seven-digit or ten-digit telephone numbers may be reached by dialing a two-digit code number.

In known two-digit repertoire dialing systems, special storage matrices are sometimes provided in which a separate section is assigned to each participating subscriber. Each section may have up to ten separate compartments therein for storing the multi-digit numbers of subscriber stations which are called most often by the participating subscriber. The sections and compartments of the matrix are coded so that the dialing of any one of ten code numbers causes a read out of the multi-digit *n* number stored in the identified compartment of the section of the matrix assigned the participating subscriber. These known systems utilize jumpering facilities for controlling the storage of the seven-digit or ten-digit numbers selected by the participating telephone subscribers.

Other known systems provide a special key which, when depressed, marks the call as an abbreviated dialing call. These systems also require number changes to be handled by the central office maintenance personnel.

An object of the invention is to provide a new and improved system of the above character which permits the participating subscriber to change the recorded seven-digit or ten-digit telephone number.

Another object of the invention is to provide a two-digit repertoire dialing system in which only a minimum of central office equipment is required.

According to the present invention, arrangements are provided wherein seven-digit numbers, ten-digit numbers or two-digit repertoire numbers are controlled exclusively by the subscriber. Each of the seven-digit or ten-digit numbers is identified by a two-digit repertoire number which the participating subscriber may dial to send the entire identified number.

Other objects and features of the invention will become apparent and the invention will be best understood when the specification and claims are read in conjunction with the accompanying single sheet of drawing showing circuit details of the abbreviated dialing equipment used in handling the two-digit abbreviated or repertoire dialing.

Aside from the establishment of a normal call by dialing every digit in the directory number of a desired subscriber station, two modes of operation may be accomplished on repertoire calls. One such mode of operation involves an automatic transmission of previously registered digits by first removing the handset and then depressing the repertoire pushbutton. The second mode of operation involves the conditioning of equipment in the repertoire storage circuits to receive a seven- or ten-digit number. To store new numbers, the subscriber momentarily pushes the repertoire pushbutton without removing the handset. Thereafter, he dials the digits of the new member which are stored in place of a previously stored number.

Dot-dashed lines are used to divide the drawing into its principal parts. That is, the box WA designates a conventional register which receives and stores subscriber transmitted dial pulses. The box ZG designates a device which scans the register and sends a train of outgoing dial pulses corresponding to the stored data. The remaining equipment (shown above the horizontal dot-dashed line) comprises a subscriber station T1*n*, a two-wire line L1, L2 and *a*, *b* and relays of a circuit for accessing and seizing a repertoire dialing circuit.

The principal items below the horizontal dot-dashed line are steering relays H1 . . . H4, F1 . . . F4, storage matrices M1, M2 and read out selection relays K11 . . . K10 and K31 . . . K30. The remaining relays are coding and control relays.

Broadly the circuit may operate in any of three different ways. One way is conventionally, as with most automatic telephone systems. Another way begins with an accessing code of dial pulses for causing steering relays H1 . . . H4, F1 . . . F4 to select a column of matrices M1, M2. This, in turn, operates relays L1 . . . L4 in a coded combination to cause the key send ZG to outpulse a desired directory number which is that stored in the selected matrix column. A third way begins with a key operation followed by the same accessing code. Again, the steering relays select a matrix column. This time, however, the key operation clears the information stored in the selected column and allows the storage of new information responsive to subscriber dial operation.

The establishment of a normal, non-repertoire type of call will be described first.

When a subscriber at station T1*n* removes a handset, the usual hookswitch contacts energize the first winding relay B in series with relay E. Both of these relays are in the repertoire dialing applique circuit ZGZ. Relay B operates but relay E does not since it is marginal and is designed not to operate on normal calls. Relay B locks operated through its second winding and contacts *b*4 and *z* to ground. At the same time contact *b*5 closes an operate circuit (also from contact *z* ground) for relay UM. Contacts *b*1, *b*2 and *b*3 open the series circuit of relays B and E and extend the line conductors L1 and L2 to contacts *um*1 and *um*2. Contact *b*6 prepares one point in a bridging circuit across the line conductors *a* and *b* which extend to succeeding equipment (not shown).

Relay UM operates and, at its contacts *um*1 and *um*2, connects the subscriber line conductors L1 and L2 to a dial register WA. Contacts *um*3 complete a holding bridge across conductors *a* and *b*.

Dial tone is returned from register WA to the subscriber station T1*n* and the digits of the called line directory number are dialed in the normal manner. These digits are stored by the register WA and then are transferred to the key sender ZG. The key sender operates relay Z and opens contacts *z* to cause relays B and UM to release. At the same time, the key sender also operates relay AN which, through its contacts *an*1 and *an*2, connects the key sender ZG in place of the loop bridge which opened when relays B and UM opened contacts *b*6 and *um*3. Contacts *j* of the key sender ZG repeat the pulses of the dialed digits to the succeding stages served by conductors *a* and *b*. When out-sending is completed, relay AN restores and the conductors *a* and *b* are again connected to the subscriber station T1*n*.

The operation of the system in handling a repertoire call will now be described. In this mode of operation, the handset is removed at station T1*n* and dial tone is returned. Then the subscriber operates a special repertoire pushbutton and causes a relay AT to operate and lock at its contacts *a*T4. Contacts *a*T3 switch the output wires of the dial register WA from the normal connection with key sender ZG to autodial equipment ZI.

The subscriber dials two digits indicative of a desired repertoire subscriber number. The first numerical designation corresponds to the first digit of a repertoire access digit and the second designation corresponds to the second access digit. These two digits are then sent from register WA and registered on corresponding ones of the relays H1 to H4 and F1 to F4. After these relays are set, an indication is transmitted therefrom to each of the respective matrices M1 and M2.

The drawing shows two groups of ten, double winding, coupling relays K11 to K10 and K31 to K30. The two windings on each relay are differentially connected with one side of the first winding of the first group of relays being connected in multiple with relay Z1 and the first winding of the second shown group of relays being connected in multiple with relay Z3. One side of the second winding of all coupling relays is connected to relays KB or KA through the key sender auxiliary circuit ZGZ.

The normally closed contacts *k*11 to *k*30 are multiplied in groups of tens and associated with normally open contacts *z*1 to *z*3. When closed, there *z* contacts connect the matrices M1 and M2 with the registering relays H1 to H4 and F1 to F4.

When the first digit of the repertoire number is dialed, one of the contacts *h*1 to *h*4, depending upon which of the relays H1 to H4 is energized, operates a corresponding one of the relays K11 to K10 and K31 to K30 in series with the relay Z. For example, if the first digit is a "1," relay H1 and its contact *h*1 operate relay K11. This, in turn, closes contacts *k*11 to energize a column in the matrices M1 or M2 by way of contacts *z*1.

When the second winding of a coupling relay is energized, relay KA operates in series with the coupling relay through contacts *at*4. When relay KA operates, it restores relay AT at contacts which are not shown. As relay AT restores, its contacts *at*4 open to release relay KA and operate relay KB.

When relay AT was first operated, its contacts *at*1 operated relay A which locked operated through its second winding II and contacts *a*1. Contacts *a*2, of relay A, operated relay W which at its contacts *w*2 applied a voltage to the row in matrices M1 and M2 in order to prepare for the read out of the information stored therein. Thus, at this time, contacts *z*1 to *z*3 are closed and *k*11 to *k*30 are opened and the matrix is un-energized.

When the second digit of the repertoire number is dialed, one set of the contacts *f*1 to *f*4 of relays F1 to F4 energize the second winding of each of the relays *k*11 to *k*31 and *k*10 to *k*30 which have a corresponding unit designation. For example, if the second digit dialed is a "2," relays K12, K22 and K32 are energized if three groups are used.

Relays K11 to K10 are operated by their first winding and relays K12, K22 and K32 are energized by their second winding, which is in opposition to the first winding; thus, the relay K12 restores because it is common to both groups and, therefore, is differentially energized. At this time the relays L1 to L4 are connected through a reading amplifier circuit LV and a switch circuit SK cause the operation of readout relays L1 to L4. These relays act through their contacts 11 to 14 in conjunction with relays K11 to K10, to cause the key sender to send the desired seven-digit to ten-digit called subscriber number. The operating path extends from contacts *a*3 through contacts *l*1 . . . *l*4 to the key sender ZG. In the usual manner, these pulses are forwarded over line conductors *a* and *b* to the next succeeding equipment. Then the autodialer comes to rest.

Next to be described is the manner of changing the information stored in the matrices. This is accomplished by pushing the repertoire dialing key K at station T1*n* without first removing the handset.

When pushed, the repertoire key K causes relay E to operate by an energization of its first winding. There is a simultaneous short-circuiting of relay B. When the special key is released, the short circuit is removed from relay B and it operates in series with relay E through contacts *b*1, *e*1, *b*2, and *b*3. Relay E locks operated through its winding II and contacts *z*. Contacts *e*4 close, and relay D is operated to seize the autodialer ZT and register WA. Relay B is locked in the manner described for a normal repertoire call.

Next the subscriber dials the two digits of the repertoire number which identify the number that is to be changed. Responsive thereto, the corresponding relays H1 to H4 and F1 to F4 operate. Since relay AT is unoperated, contacts *e*5 are utilized in place of contacts *at*3. Relay KB is operated instead of relay KA (which operates only during a normal repertoire call).

Contacts *kb*3 open and release relay D. This causes contacts *d* to open so that a release pulse is sent from wire LJ through contacts *kb*2 to the matrices M1, M2 to cancel the stored information identified by the two digits just dialed. Relay KB also operates contacts *kb*1 to switch the output of the dial register WA to the matrices to M1, M2. Thus, after the matrices are cleared out, the calling subscriber may dial to store new information in the cleared column.

The foregoing illustrates a simple and reliable procedure controlled by the subscriber for causing an automatic readout of any specific information stored in the matrices and for altering the information stored in the matrices in order to set up a different repertoire number.

While the principles of the present invention have been described above in connection with a particular embodiment, it is to be clearly understood that this description is made only by way of example and not as a limitation to the scope of the invention.

We claim:

1. A repertoire dialing system for converting multi-element code numbers received over any one of a plurality of calling lines into respectively corresponding multi-digit telephone numbers assigned to the code numbers and including means for adding new telephone numbers corresponding to selected code numbers, matrix means for storing data indicative of said multi-digit telephone numbers, subscriber stations associated with said lines, each subscriber station including first signal generating means for selectively generating first control signals and dial means for generating second control signals, means responsive to said first control signals for controlling the said matrix means to read out said stored data, means responsive to said second control signals to change said stored data, and means at said subscriber station for selecting between read-out and data changing.

2. A system as set forth in claim 1 wherein said stations include hookswitch means and key control means, and wherein said means at said subscriber stations is operative responsive to the operation of said hookswitch means and key control means in either a first or a second order of sequence to selectively control the read out or data changing.

3. A system as set forth in claim 2 wherein the open and closed condition of the loop across any said line is indicative of the said first and second control signals.

4. A system as set forth in claim 3 wherein said means for controlling said matrix means includes marginal relay means for detecting the said open and closed conditions of said loop.

(References on following page)

References Cited

UNITED STATES PATENTS

| | | | |
|---|---|---|---|
| 2,883,472 | 4/1959 | Stehlik | 179—18 |
| 2,951,908 | 9/1960 | Malthaner et al. | 179—18 |
| 3,160,713 | 12/1964 | Williford | 179—90.2 X |
| 3,194,890 | 7/1965 | Haskins | 179—18 |
| 3,218,634 | 11/1965 | Olsson | 179—90.2 X |

KATHLEEN H. CLAFFY, *Primary Examiner.*

L. A. WRIGHT, *Assistant Examiner.*